United States Patent [19]

Back

[11] 4,431,583
[45] Feb. 14, 1984

[54] PHENYL- OR NAPHTHYL-AZO-(8-HYDROXYQUINO-LINE) 1:2-COBALT COMPLEX DYES FOR LEATHER

[75] Inventor: Gerhard Back, Lörrach, Fed. Rep. of Germany

[73] Assignee: Ciba-Geigy Corporation, Ardsley, N.Y.

[21] Appl. No.: 183,892

[22] Filed: Sep. 4, 1980

Related U.S. Application Data

[63] Continuation of Ser. No. 2,274, Jan. 10, 1979, abandoned, which is a continuation of Ser. No. 815,890, Jul. 15, 1977, abandoned, which is a continuation of Ser. No. 604,412, Aug. 13, 1975, abandoned.

[30] Foreign Application Priority Data

Sep. 13, 1974 [CH] Switzerland ............... 12522/74

[51] Int. Cl.$^3$ ............... C09B 29/44; C09B 45/20; D06P 3/24; D06P 3/32
[52] U.S. Cl. ............... 260/146 R; 260/155
[58] Field of Search ............... 260/146 R, 155

[56] References Cited

U.S. PATENT DOCUMENTS 1,775,644  9/1930  Kammerer et al. ............ 260/146 R
1,991,808  2/1935  Krzikalla et al. ............. 260/146 R
2,676,956  4/1954  Anderau ..................... 260/155
2,830,042  4/1958  Dittmar et al. .............. 260/146 R
3,073,013  1/1963  Gross et al. ................ 260/146 R

FOREIGN PATENT DOCUMENTS 590190  12/1933  Fed. Rep. of Germany ... 260/146 R
1159412 10/1956  France ..................... 260/146 R

OTHER PUBLICATIONS

Houben-Weyl, "Methoden der Organischen Chemie", vol. X/3, p. 437 (1965).

Primary Examiner—Floyd D. Higel
Attorney, Agent, or Firm—Edward McC. Roberts

[57] ABSTRACT

1:2 Cobalt complex dyes of azo compounds of the formula

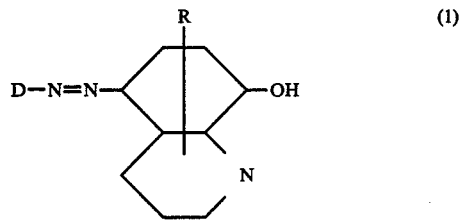

(1)

wherein D is a phenyl or naphthyl radical which is substituted by sulphonic acid groups, halogen atoms, alkyl, alkoxy, nitro, cyano, acylamino or arylazo groups or is unsubstituted, and R is a hydrogen atom, a sulpho group, a halogen atom or a methyl group, and wherein the total number of sulpho groups present is 1 to 3. The dyes are suitable for dyeing polyamide materials such as wool, silk, synthetic polyamides and leather, particularly the latter. The dyes give full brown shades of good covering power with excellent fastness to light.

2 Claims, No Drawings

PHENYL- OR NAPHTHYL-AZO-(8-HYDROXYQUINOLINE) 1:2-COBALT COMPLEX DYES FOR LEATHER

This is a continuation of application Ser. No. 002,274 filed on Jan. 10, 1979, now abandoned, which in turn is a continuation of application Ser. No. 815,890, filed July 15, 1977, now abandoned, which in turn is a continuation of application Ser. No. 604,412, filed Aug. 13, 1975, now abandoned.

The present invention provides 1:2 cobalt complex dyes of azo compounds of the formula

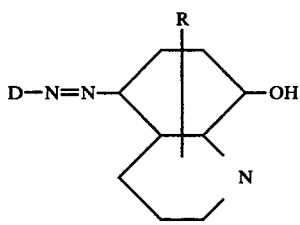

wherein D is a phenyl or naphthyl radical which is substituted by sulphonic acid groups, halogen atoms, alkyl, alkoxy, nitro, cyano, acylamino or arylazo groups or is unsubstituted, and R is a hydrogen atom, a sulpho group, a halogen atom or a methyl group, and wherein the total number of sulpho groups present is 1 to 3.

These cobalt complexes are obtained in the customary manner by reacting azo compounds of the formula (1) with a cobalt donor, e.g. cobalt-II sulphate or cobalt-II acetate. It is advisable to carry out the process in the presence of complexing agents, e.g. tartaric acid.

The radical D is derived from aromatic amines of the benzene or naphthalene class. Preferably D is a phenyl, naphthyl, naphthylazophenyl, phenylazonaphthyl, naphthylazonaphthyl or phenylazophenyl radical which contains a sulpho group and optionally further substituents, especially chlorine or bromine atoms, nitro groups, low molecular alkyl, alkoxy, alkanoylamino or alkoxycarbonyl groups. The term "low molecular" denotes herein groups of 1 to 4 carbon atoms.

As coupling components, mention is to be made of 8-hydroxyquinoline and derivatives thereof, in particular 8-hydroxyquinolines which are substituted by a chlorine atom, a methyl group or a sulpho group.

Preferred cobalt complexes of azo dyes are those obtained from a diazotised anilinesulphonic acid, especially from metanilic acid, and 8-hydroxyquinoline.

The new cobalt complexes are suitable for dyeing polyamide materials such as wool, silk and synthetic polyamides, but are especially suitable for dyeing leather. They give full brown shades of good covering power and are characterised by outstanding fastness to light. Surprisingly, they are in general distinctly superior in this respect to the chromium complexes known from DRP No. 590 190.

In the following Examples, the parts and percentages are by weight.

EXAMPLE 1

17.3 parts of 1-aminobenzene-4-sulphonic acid are suspended in 80 parts by volume of water. The clear solution obtained after addition of 4 parts of sodium hydroxide is treated with 25 parts by volume of a 4 normal aqueous sodium nitrite solution and subsequently added dropwise at a temperature of 5° C. to a mixture of 23.5 parts by volume of 35% hydrochloric acid and 100 parts of ice. The suspension of the diazo compound, which contains a slight excess of nitrite, is stirred for 30 minutes. The excess nitrite is then destroyed with a 10% solution of sulphamic acid. A solution of 14.8 parts of 8-hydroxyquinoline in 40 parts by volume of water and 12 parts by volume of 35% hydrochloric acid is then added and the coupling mixture is cooled with ice to 5°–8° C. With constant cooling in an ice water bath, 75 parts by volume of a 15% sodium hydroxide solution are added dropwise until a pH of 9 to 9.5 is obtained. The coupling is terminated after a brief time. The resultant dye of the constitution

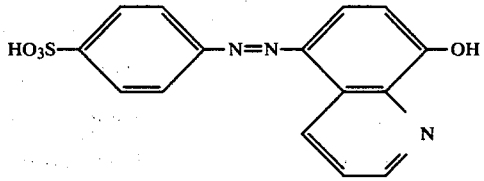

falls out as an orange brown precipitate.

For conversion into the 1:2 cobalt complex, the coupling suspension is heated to 75°–80° C. and adjusted to a pH of 9.5 to 10.5 by addition of a 30% sodium hydroxide solution, in the process of which a clear, reddish brown solution forms. At the same temperature, a solution of 13.5 parts of cobalt-II sulphate hepthydrate and 7.5 parts of tartaric acid in 50 parts by volume of water of 70° C. is added and the pH is kept in the range of 9–10 by the dropwise addition of further sodium hydroxide solution. The colour of the solution changes from reddish brown to yellowish brown. As soon as it is no longer possible to detect any metal-free starting dye, the resultant clear solution of the cobalt complex is evaporated in vacuo to dryness.

After it has been ground, the new dye is in the form of a brown, slightly water-soluble powder and dyes chrome leather in conventional processes in full yellowish brown shades of good fastness to light.

Dyeing Procedure for Leather 100 parts of clothing velours leather (dry weight) are wet back at 50° C. for 2 hours in a solution of 1000 parts of water and 2 parts of 24% ammonia and subsequently dyed for 1 hour at 60° C. in a solution of 1000 parts of water, 2 parts of 24% ammonia and 6 parts of the dye of Example 1. A solution of 40 parts of water and 4 parts of formic acid (85%) is then added and dyeing is continued for 2 further 30 minutes. The leather is then thoroughly rinsed and, if appropriate, treated for 30 minutes at 50° C. with 2 parts of a dicyandiamine/formaldehyde condensation product. Other kinds of velour leather as well as glove leather can be dyed in the same manner.

EXAMPLE 2

A likewise readily water-soluble cobalt complex dye which dyes chrome leather in yellowish brown shades of somewhat redder hue is obtained by using 1-aminobenzene-2-sulphonic acid as diazo component and otherwise proceeding according to the particulars of Example 1.

The following Table contains further 1:2 cobalt complexes of azo dyes which can be obtained by combining the diazo components in column I with the coupling components of column II. The shades obtainable on chrome leather are indicated in column III.

| No. | I | II | III |
|---|---|---|---|
| 1 | 1-aminobenzene-3-sulphonic acid | 8-hydroxyquinoline | yellowish brown |
| 2 | 1-amino-2-chlorobenzene-5-sulphonic acid | 8-hydroxyquinoline | yellowish brown |
| 3 | 1-aminonaphthalene-4-sulphonic acid | 8-hydroxyquinoline | orange brown |
| 4 | 1-aminonaphthalene-6(7)-sulphonic acid | 8-hydroxyquinoline | orange brown |
| 5 | 2-aminonaphthalene-6-sulphonic acid | 8-hydroxyquinoline | orange brown |
| 6 | 2-aminonaphthalene-1-sulphonic acid | 8-hydroxyquinoline-7-sulphonic acid | orange brown |
| 7 | 1-amino-2-methoxybenzene-5-sulphonic acid | 8-hydroxyquinoline | orange brown |
| 8 | 1-amino-2,5-dimethoxybenzene-4-sulphonic acid | 8-hydroxyquinoline | reddish brown |
| 9 | 4-amino-1-azobenzene-4-sulphonic acid | 8-hydroxyquinoline | dark brown |
| 10 | 4-amino-1-azobenzene-4-sulphonic acid | 8-hydroxyquinoline-7-sulphonic acid | dark brown |
| 11 | 1-amino-2-nitrobenzene-4-sulphonic acid | 8-hydroxyquinoline | reddish brown |
| 12 | 1-amino-2-nitrobenzene-4-sulphonic acid | 7-chloro-8-hydroxyquinoline | reddish brown |
| 13 | 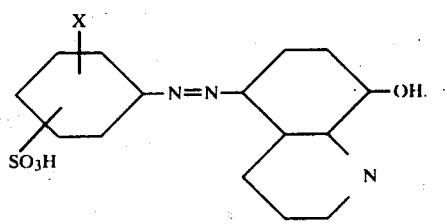 | 8-hydroxyquinoline | brown |
| 14 | 1-amino-4-chlorobenzene-3-sulphonic acid | 8-hydroxyquinoline | yellowish brown |
| 15 | 1-amino-4-methylbenzene-3-sulphonic acid | 8-hydroxyquinoline | brown |
| 16 | 1-amino-2,5-dichlorobenzene-4-sulphonic acid | 8-hydroxyquinoline | brown |

I claim:
1. A 1:2 cobalt complex dye of an azo compound of the formula

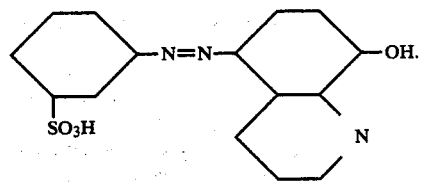

wherein X is hydrogen, chloro or methyl.

2. The 1:2 cobalt complex according to claim 1 of the azo compound of the formula (3)

* * * * *